US006253247B1

(12) United States Patent
Bhaskar et al.

(10) Patent No.: US 6,253,247 B1
(45) Date of Patent: Jun. 26, 2001

(54) SYSTEM AND METHOD FOR TRANSMITTING A USER'S DATA PACKETS CONCURRENTLY OVER DIFFERENT TELEPHONE LINES BETWEEN TWO COMPUTER NETWORKS

(75) Inventors: Ragula Bhaskar; Sanchaita Datta, both of Salt Lake City, UT (US)

(73) Assignee: Ragula Systems, Salt Lake City, UT (US)

( * ) Notice: Subject to any disclaimer, the term of this patent is extended or adjusted under 35 U.S.C. 154(b) by 0 days.

(21) Appl. No.: 08/859,070

(22) Filed: May 20, 1997

Related U.S. Application Data

(60) Provisional application No. 60/031,203, filed on Nov. 21, 1996.

(51) Int. Cl.[7] ................................................... G06F 17/28
(52) U.S. Cl. ................................................ 709/237; 370/276
(58) Field of Search .............................. 370/84, 112, 95, 370/94.1, 493, 442, 466, 376, 353, 271, 389, 321, 260, 495, 62, 65, 401, 535–545, 276; 375/222; 709/236, 237; 380/30, 49; 379/219; 713/301

(56) References Cited

U.S. PATENT DOCUMENTS

| | | | |
|---|---|---|---|
| 4,577,312 | 3/1986 | Nash ..................................... | 370/84 |
| 4,734,920 | 3/1988 | Betts ...................................... | 375/8 |
| 4,740,959 | * 4/1988 | Kosugi et al. ......................... | 370/95 |
| 4,785,448 | 11/1988 | Reichert et al. ...................... | 370/76 |
| 4,862,456 | * 8/1989 | Giorgio ................................ | 370/276 |
| 5,058,133 | 10/1991 | Duncanson et al. .................. | 375/38 |
| 5,058,163 | * 10/1991 | Lubarsky et al. ..................... | 380/49 |
| 5,062,104 | 10/1991 | Lubarsky et al. ..................... | 370/60 |
| 5,113,390 | * 5/1992 | Hayashi et al. ....................... | 370/65 |
| 5,204,949 | 4/1993 | Yasue et al. .......................... | 395/200 |
| 5,231,649 | 7/1993 | Duncanson ............................ | 375/38 |
| 5,293,378 | 3/1994 | Shimizu ............................... | 370/94.1 |
| 5,333,132 | 7/1994 | Chuniaud et al. ................... | 370/58.1 |
| 5,384,766 | 1/1995 | Yamato et al. ........................ | 370/13 |
| 5,390,239 | 2/1995 | Morris et al. ......................... | 379/93 |
| 5,400,328 | 3/1995 | Burren et al. ......................... | 370/79 |
| 5,416,842 | * 5/1995 | Aziz ...................................... | 380/30 |

(List continued on next page.)

OTHER PUBLICATIONS

"Adaptec® 1394© High Performance Serial Bus", Anonymous, www.adaptec.com, no later than Oct. 20, 1997, pp. 1–2.

"Briefs: Giga to ship fat pipe", Anonymous, *GigaLabs Inc.,* Sep. 30, 1996, p. 1.

"Ethernet Backbone Switches: On the Road to ATM", C. Darling, *Datamation,* Jan. 1, 1996, pp. 1–4.

"Gigabit Ethernet: Fat Pipe or Pipe Bomb?", E. Roberts, wysiwyg://41/http://www.data.com, May 1997, pp. 1–5.

(List continued on next page.)

*Primary Examiner*—Robert B. Harrell
*Assistant Examiner*—Thong Vu
(74) *Attorney, Agent, or Firm*—Computer Law[++]

(57) ABSTRACT

Methods and systems are provided for transmitting a user's data between two computer networks over physically separate telephone line connections which are allocated exclusively to the user. The user's data is placed in data packets, which are multiplexed onto the separate connections and sent concurrently to a demultiplexer. The data packets contain a computer network address such as an Internet protocol address. A dynamic address and sequence table allows the demultiplexer operation to restore the original order of the data after receiving the packets. The set of connections constitutes a virtual "fat pipe" connection through which the user's data is transmitted more rapidly. Additional users may be given their own dedicated "fat pipe" connections.

19 Claims, 9 Drawing Sheets

U.S. PATENT DOCUMENTS

| | | | |
|---|---|---|---|
| 5,426,645 | | 6/1995 | Haskin ................................. 370/118 |
| 5,440,564 | * | 8/1995 | Ovada et al. ........................ 370/112 |
| 5,453,986 | * | 9/1995 | Davis et al. ........................... 370/62 |
| 5,457,715 | | 10/1995 | Sakaki et al. ....................... 375/260 |
| 5,459,720 | | 10/1995 | Iliev et al. ............................. 370/60 |
| 5,479,407 | * | 12/1995 | Ko et al. ............................. 370/94.1 |
| 5,491,695 | | 2/1996 | Meagher et al. ..................... 370/112 |
| 5,506,844 | * | 4/1996 | Rao ....................................... 370/84 |
| 5,524,111 | | 6/1996 | Le Pennec et al. ................... 370/84 |
| 5,526,350 | | 6/1996 | Gittins et al. ....................... 370/58.1 |
| 5,539,740 | | 7/1996 | Brückner ............................ 370/60.1 |
| 5,594,727 | * | 1/1997 | Kolbenson et al. ................. 370/442 |
| 5,619,508 | * | 4/1997 | Davis et al. ......................... 370/495 |
| 5,640,398 | * | 6/1997 | Carr et al. ........................... 370/376 |
| 5,678,004 | * | 10/1997 | Thaweethai .......................... 713/301 |
| 5,680,551 | * | 10/1997 | Martino, II .......................... 709/238 |
| 5,684,825 | * | 11/1997 | Ko ....................................... 375/222 |
| 5,764,628 | * | 6/1998 | Davis et al. ......................... 370/271 |
| 5,784,362 | * | 7/1998 | Turina ................................. 370/321 |
| 5,787,088 | * | 6/1998 | Dagdeviren et al. ................ 370/493 |
| 5,793,763 | * | 8/1998 | Mayes et al. ........................ 370/389 |
| 5,796,742 | * | 8/1998 | Klotzbach et al. .................. 370/466 |
| 5,802,053 | * | 1/1999 | Bollella et al. ...................... 370/401 |
| 5,812,534 | * | 9/1998 | Davis et al. ......................... 370/260 |
| 5,859,904 | * | 1/1999 | Huang ................................. 379/219 |
| 5,875,189 | * | 2/1999 | Brownhill et al. ................... 370/395 |

OTHER PUBLICATIONS

"Jungkind Photo Graphic and Southwestern Camera offer the Highest Quality Hardware for High Speed Networking", Anonymous, *Asanté Technologies*, no later than Oct. 20, 1997, pp. 1–4.

"Switched Ethernet", J. Mazza, jmazza.shillsdata.com, no later than Oct. 20, 1997, pp. 1–6.

"A New Way to Boost A Phone Line's Throughput", Anonymous, *Electronics*, Apr. 28, 1986, pp. 29–30.

"Using Multiple Links to Interconnect LANs and Public Circuit Switched Data Networks", T. Liao et al., *Communication Systems: Towards Global Integration. Singapore ICCS '90*, Nov. 5–9 1990, pp. 8–12, vol. 1.

"WebRamp", Anonymous, www.rampnetworks.com, no later than Aug. 18, 1997, Selected Excerpts.

"Selected Abstracts", no later than Dec. 20, 1996.

* cited by examiner

SYSTEM AND METHOD FOR TRANSMITTING A USER'S DATA PACKETS CONCURRENTLY OVER DIFFERENT TELEPHONE LINES BETWEEN TWO COMPUTER NETWORKS

RELATED APPLICATIONS

The present application is a continuation of commonly owned copending U.S. provisional patent application Ser. No. 60/031,203, filed Nov. 21, 1996, which is incorporated herein by reference.

FIELD OF THE INVENTION

The present invention relates to a system and method for transmission of data between two computer networks, and more particularly to concurrent transmission of a particular user's data in packets over two or more telephone connections between computer networks.

TECHNICAL BACKGROUND OF THE INVENTION

Information may be sent between different computers by connecting the computers in a network. The Internet is a computer network which connects computers around the world. Another popular type of network, which is limited to a relatively small geographic area, is called a "local area network" or "LAN." Businesses also often use an "intranet" network, which is based on Internet technology but is geographically restricted.

FIGS. 1 and 2 illustrate a problem encountered by many network users. LANs and intranets 10, 12 are relatively fast. That is, they can rapidly transmit large amounts of information internally. Portions of the Internet 14 are also relatively fast. However, connections 16 between LANs, and connections 18 between a LAN and the Internet 14, are typically much slower than connections within a given LAN or intranet 10, 12.

The connections 16 available today to interconnect two local area computer networks 10, 12 using a single serial link are analog and digital telephone lines, dedicated lines such as T1 and T3 connections, direct dial-in modems, and multiple channels sent over the same serial link such as Integrated Subscriber Digital Network (ISDN) connections. A T1 line gives about 1.544 Mb/s but costs a significant amount of money for the privilege of having a dedicated line. ISDN is also relatively fast and expensive. Other serial connections are much less expensive, but also much slower.

FIG. 2 shows one of the publicly discussed plans for connecting multiple geographically dispersed LANs 10, 12 using the Internet 14. The Internet 14 acts as part of the conduit for the transmission of data. The data from one LAN or intranet 10 is transmitted by way of a telephone connection 18 to a local Internet Service Provider ("ISP") 20 which then transmits the data over another connection 22 to the Internet 14. From the Internet 14, the data travels over a connection 24 to a remote ISP 26 that services the remote LAN 12. The ISP 26 transmits the data to the LAN 12 over a connection 28. The main advantage of this method is that there are no toll charges for the connections 18, 28, as they are made locally. In addition, a traveling sales representative of the company, for instance, can login to any local ISP and access the corporate LAN using a password.

However, a bottleneck in this scenario is the slow speed of conventional connections 18, 28 between the ISPs and the LANs where a modem or an inexpensive dedicated line is used. The slow nature of the connections 18, 28 between the ISP and the user prevents the user as well as the cyber community at large from utilizing the full commercial value of the Internet 14 such as for video on demand, downloading large data files or connecting corporate intranets 10, 12 over a wide area network.

One source of this limitation on cheap bandwidth is that for a given user each of the connections 16, 18, 28 relies on a single physical connection from one LAN or intranet 10 to the other LAN or intranet 12. Thus, a drawback of conventional technology is that the data bandwidth of the user's connection between the two LANs 10, 12 is limited by the total bandwidth of a single physical connection 16, 18, 28. While a company may have a high speed LAN 10 or 12 within its premises, its LAN 10 to corporate LAN 12 connectivity is slowed by the use of slow connections to the Internet 14 or other wide area networks ("WANs").

In spite of these drawbacks, the Internet 14 has become the information highway of choice, and corporations with several geographically distributed offices are planning to use the Internet 14 to connect their dispersed sites. They are also planning private Internet-like networks.

Thus, it would be an advancement in the art to provide a novel system and method for connecting LANs to allow faster but relatively inexpensive transmission of a given user's data.

It would be an additional advancement to provide such a system and method which can be used to connect a user on one LAN with another LAN through the Internet.

Such a method and system are disclosed and claimed herein.

BRIEF SUMMARY OF THE INVENTION

The present invention provides methods and systems for transmitting a user's data between two computer networks. One method of the invention includes obtaining at least two connections between the two computer networks. Each of the connections uses a telephone line which is physically separate from the other connection(s) for at least a portion of that connection. The method allocates the obtained connections exclusively to the user for a period of time, during which it places the user's data in data packets and sends the data packets concurrently over the allocated connections.

The set of connections constitutes a virtual "fat pipe" connection through which the user's data is transmitted more rapidly, without requiring the extreme expense of T1, T3, ISDN, or similar connections. Additional users may be given their own dedicated "fat pipe" connections.

The data packets may be configured to contain a computer network address such as an IP (Internet protocol) address. The step of sending the data packets includes multiplexing by sending a first data packet containing a first portion of the user's data and a first IP address over a first allocated connection and concurrently sending a second data packet containing a second portion of the user's data and a second IP address over a second allocated connection.

A mapping is established between multiple IP addresses contained in data packets sent concurrently over the allocated connections, on the one hand, and a corresponding single IP address contained in corresponding data packets sent between the user and the allocated connections, on the other hand. The mapping allows a demultiplexing operation on the received packets to restore the original order of the data as it existed before being broken into packets.

The invention also provides a mux device for assisting the transmission of a user's data between two computer networks. The mux device includes a means for allocating exclusively to the user for a period of time at least two connections between the two computer networks, each of the connections using a telephone connection which is physically separate from the other connection(s) for at least a portion of that connection; a means for accepting data packets for transmission, each data packet containing a portion of the user's data and also containing a computer network address; and a means for submitting data packets to the allocated connections for concurrent transmission, the submitted data packets corresponding in user data content to the accepted data packets.

One embodiment of the mux device also includes a means for receiving data packets transmitted over the allocated connections, a means for advancing the data in those data packets toward an application program, and a mapping means such as an IP address table. The mux device is bidirectional, allowing the use of one or more pairs of mux devices, with each device acting in turn as a multiplexer (mux) and a demultiplexer (demux). By allowing the creation and management of virtual "fat pipe" connections the mux/demux devices provide substantially faster throughput than a conventional serial link, without the expense of a dedicated T1 or similar line.

Error or exception handling may include disconnecting a line that has a bad connection, reconfiguring the pipe to use less than the initial number of lines while continuing to transmit data, and attempting to re-establish a connection and then reconfiguring the mapping tables if the connection is re-established.

Other features and advantages of the present invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

The present invention relates to a system and method for connecting LANs or intranets over the Internet, over a private Internet, or over any wide area network. In one embodiment, the invention uses unique connection identifiers such as IP addresses to multiplex and de-multiplex data packets generated from a LAN. This enables the transmission of data to disparate entities such as Internet service providers, corporate LANs, and others.

Without limitation, data transmitted according to the invention may be live (real-time or near real-time) video, live audio, file contents, sensor readings, control signals, web page data, protocol or other control signals, or a combination of the preceding.

The invention also allows more beneficial use of existing physical systems such as modem banks because it can use existing modems and phone lines.

Details of the invention are discussed below in connection with the Figures. A given number denotes the same item, or substantially similar items, throughout the Figures.

Overview

Figure 3:
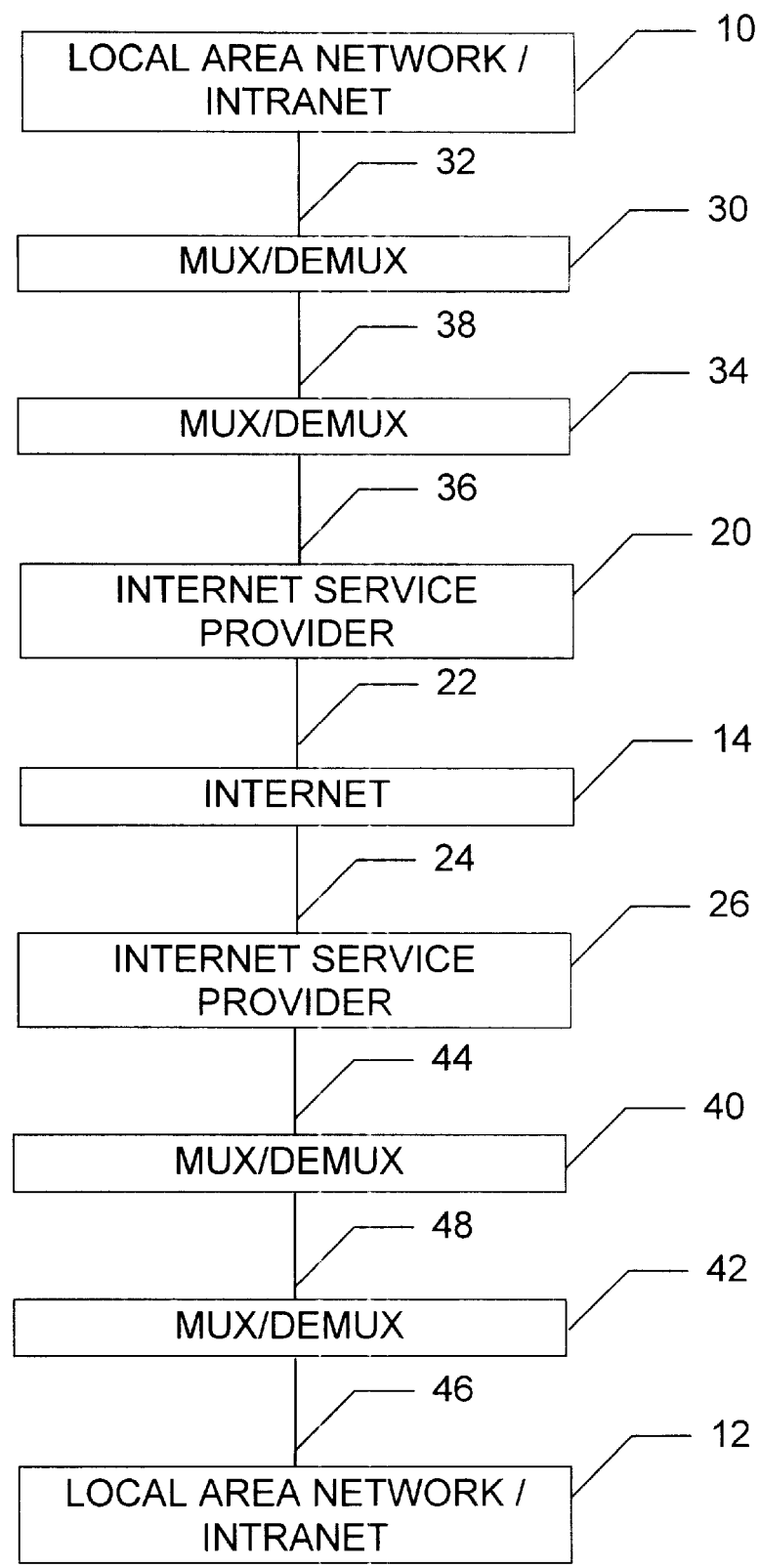
FIG. 3 is a diagram illustrating an approach for connecting two LANs according to the present invention.

One embodiment of the invention is illustrated in FIG. 3. A multiplexing/demultiplexing device 30 ("mux/demux") is connected to the first LAN 10 using a connection 32. Another mux/demux 34 is similarly connected by a high-bandwidth connection 36 to the ISP 20. The mux devices 30, 34 may be embodied in a single loaded printed circuit board, or in other forms appreciated by those of skill in the art, and may comprise computer memory, computer processors and other logic, and computer software and/or firmware.

The multiplexing devices 30, 34 are connected by several communication lines such as telephone voice lines, telephone dedicated data lines, and/or telephone wireless communications links. The separate communication connections cooperate under the direction of the mux devices 30, 34 to form a virtual "fat pipe" connection 38. Two more mux/demux devices 40, 42 are similarly connected to the ISP 26 and the remote LAN 12 by connections 44, 46, respectively. The second pair of mux/demux devices 40, 42 are connected by a second virtual "fat pipe" connection 48.

Figure 1:
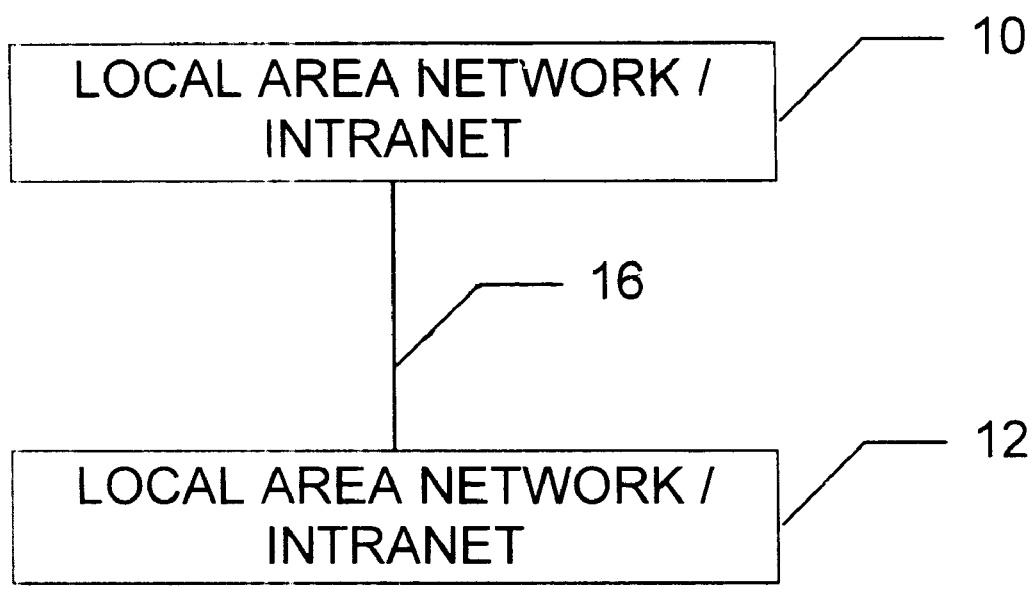
FIG. 1 is a diagram illustrating a prior art approach to directly connect two LANs.
Figure 2:
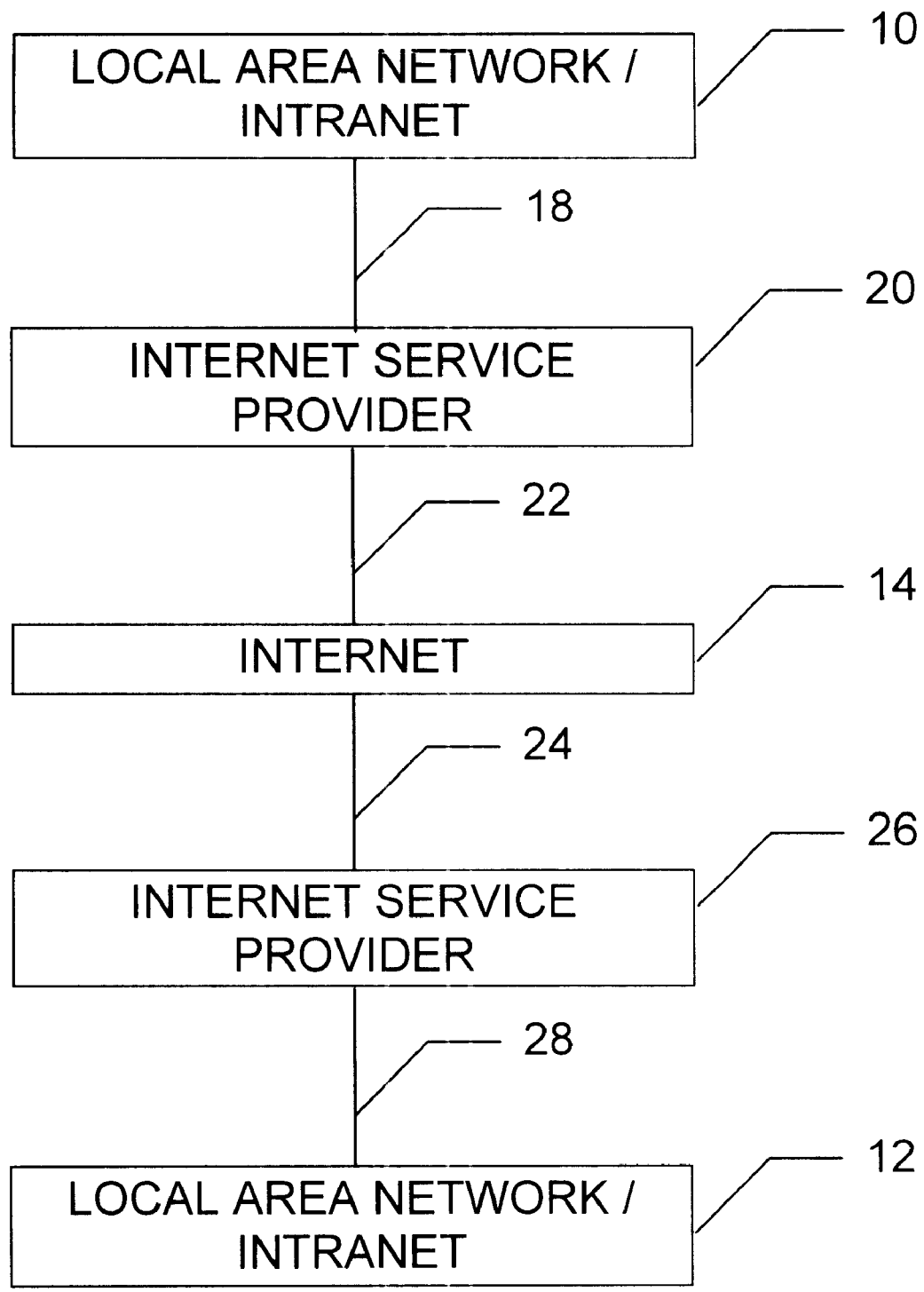
FIG. 2 is a diagram illustrating a prior art approach connecting two LANs through the Internet.

The pipes 38, 48 limit bandwidth less than it was limited by the conventional connections 16 (FIG. 1), 18, and 28 (FIG. 2). The total data bandwidth between the two LANs 10, 12 in FIG. 3 is essentially the sum of the bandwidths of separate connections in the pipes 38, 48. In the case where each pipe 38, 48 contains identical separate connections, the bandwidth available to a given user is the bandwidth of one of those connections multiplied by the number of connections in the pipe 38 or 48. The multiple serial lines in the pipes 38, 48 appear to the two connected LANs 10, 12 as part of a single virtual high-speed connection.

As illustrated, each mux-demux 30, 34, 40, 42 has two sets of connections. One connection (32, 36, 44, 46) is to a LAN 10, 12 or an ISP (or ISP LAN) 20, 26. This connection could take several physical forms such as copper wire, optical fiber, or other forms. The second set of connections 38, 48 include one or several modem connections. The modems employed could use any modem communication technology from analog to digital communications or a hybrid system. Examples are 28.8 kpbs, ISDN, ADSL and xDSL technology or any other modem technology.

Data packets on a given LAN could be in the form of Ethernet packets, token ring packets, ATM packets or any form of LAN packet or data stream emanating from the LAN or intranet or similar local communication system.

The mux/demux devices help connect the two LANs 10, 12 together to allow data to be exchanged between the LANs. Packets may be muxed and demuxed by the devices 30, 34, 40, 42 using packet or sequence numbers embedded in the packets. Alternatively, packets may be muxed and demuxed by sending and receiving the packets in a round-robin or other predictable sequence over the connections in the pipe 38 or 48. For instance, the device 30 could send on line 1, send on line 4, send on line 6, send on line 1, send on line 4, send on line 6, etc., with the paired device 34 receiving in the same order: 1,4,6,1,4,6, and so on.

In an alternative embodiment, the LAN 12 replaces the ISP 20 and the mux/demux devices 30, 34 directly connect the LANs 10, 12 instead of connecting them through the Internet. In this alternative system, components 14, 20, 22, 24, 26, 40, 42, 44, 46, and 48 are not required.

System Initialization

To promote suitable operation, the user or an administrator initially configures the devices 30, 34, 40, 42. Suitable configuration parameters may include: IP address, maximum number of serial lines allowed per user or maximum bandwidth allowed per user (may be set by a systems administrator or availability of lines), maximum data bandwidth allowed per connection, the type of serial communication links, type of security checks required, authorized users, number of users, etc. Those of skill in the art will appreciate that various combinations of parameters may be configurable, that default values may be provided, and that configuration may be accomplished in an interactive, batch, or automatic exploratory manner.

System Operation

To start the communication, the user sends a request to the mux-demux to establish a "fat pipe" connection. The mux-demux establishes a modem connection over a wide area network such as the Internet 14. Once the connection is established, mux-demux receives an IP address from the WAN, remote intranet or Internet provider LAN or like device.

The mux-demux 30 at the user site can communicate with the remote LAN 12 in three different ways. These include mux-demux to remote mux-demux communication, shown in FIG. 4; mux-demux to remote interceptor communication, shown in FIG. 5; and mux-demux to remote software communication, shown in FIG. 6.

Figure 4:
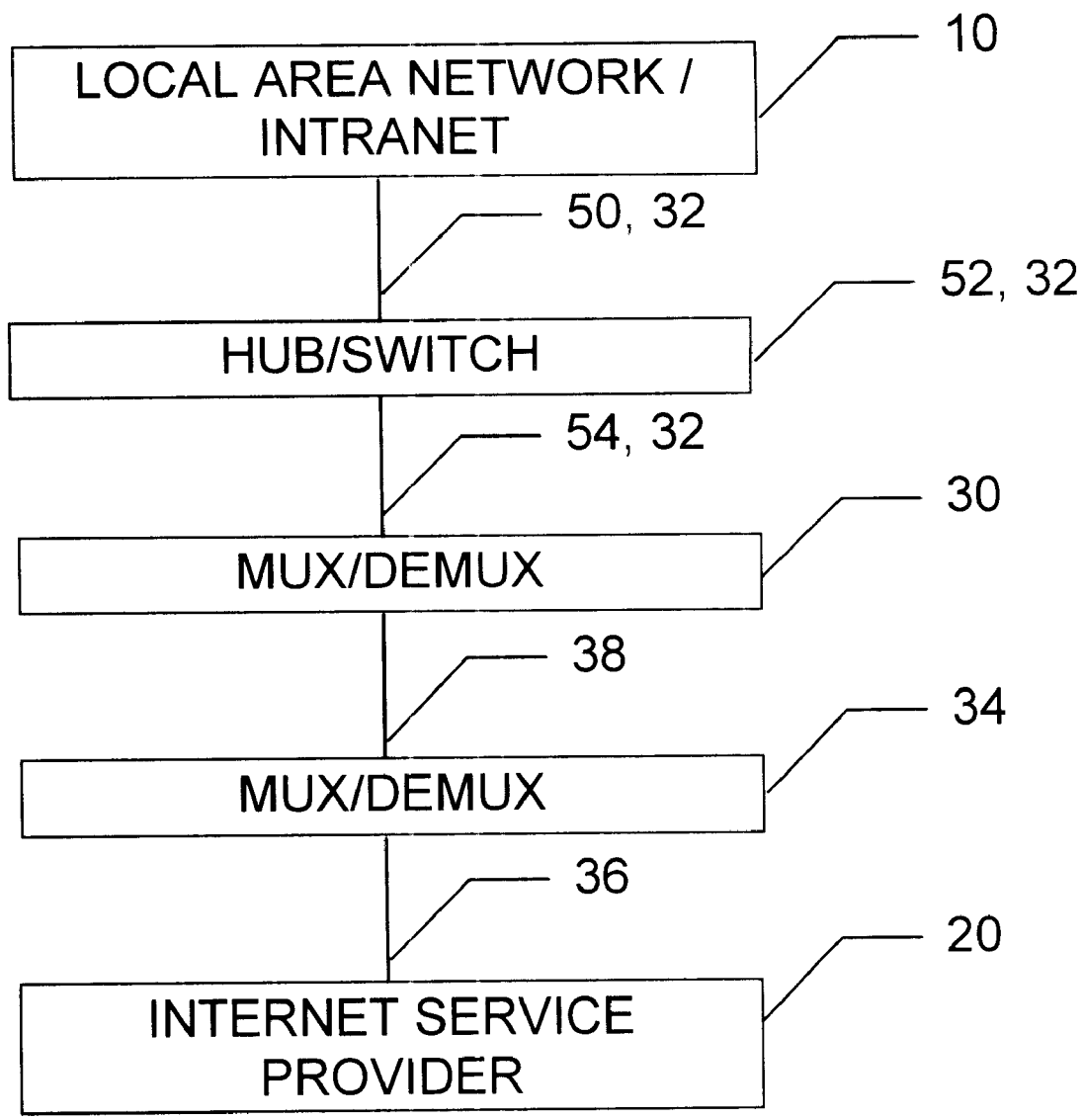
FIG. 4 is a diagram illustrating an alternative approach for connecting two LANs according to the present invention.

According to the approach illustrated in FIG. 4, the mux-demux 30 communicates with the device 34 at the remote site. Serial or other connections 50 connect computers in the LAN 10 to a network hub or switch 52, which is connected to the mux/demux 30 by a connection 54. The switch 52 and the connections 50, 54 together form the connection 32 shown in FIG. 3. A similar architecture may be used at the remote LAN 12, or an architecture such as that shown in FIG. 5 or FIG. 6 may be used.

Both mux-demux 30 and mux-demux 34 may be instances of the same multiplexing-demultiplexing device, with one device 30 located at the user site and the second device 34 located at the remote site. The mux-demux 30 sends a message to the remote mux-demux 34 indicating that multiple modem connections are requested. In response, device 34 provides device 30 with the next telephone number to connect with on behalf of the given user. Device 30 then makes the next connection with device 34. The process is repeated until all required connections for the pipe 38 are made on behalf of the user.

An alternative is to do this handshaking (connection identification and sequence) after the requisite number of modem connections are established. In that case, N independent and available telephone numbers are dialed to the remote site and the unique IDs assigned to the multiple modems are then read into a table. Of course, the process can be repeated for additional users, so that several users each obtain the benefits of parallel transmission over several connections or lines, with one pipe 38 per user.

When the first modem connection is made, a unique ID is assigned by the arbitrator such as the ISP 20 or intranet. The ID may take the form of an Internet Protocol (IP) address. The first modem may sense the IP addresses (or similar unique identifiers) of the other connections in the pipe 38. The IP data are now assembled into a table and device 30 is assigned N IP addresses to send the data to device 34. Device 30 multiplexes the LAN data over the multiple serial lines using multiple IP addresses. On the remote end, device 34 demultiplexes the data on to the ISP 20. Both devices 30, 34 maintain a table of IP addresses to be multiplexed or demultiplexed.

An alternative to the IP addressing method is to assign unique identifiers to the different lines in the pipe 38 and embed multiplexing/demultiplexing information in the data packets when each data packet is encapsulated. The demux 34 examines the data packet, retrieves the unique identifier information and then processes the packet according to the required sequence. While processing the data packet, the mux-demux 24 retrieves the data information from the packet to put it on the WAN 14 in the right sequence.

Figure 5:
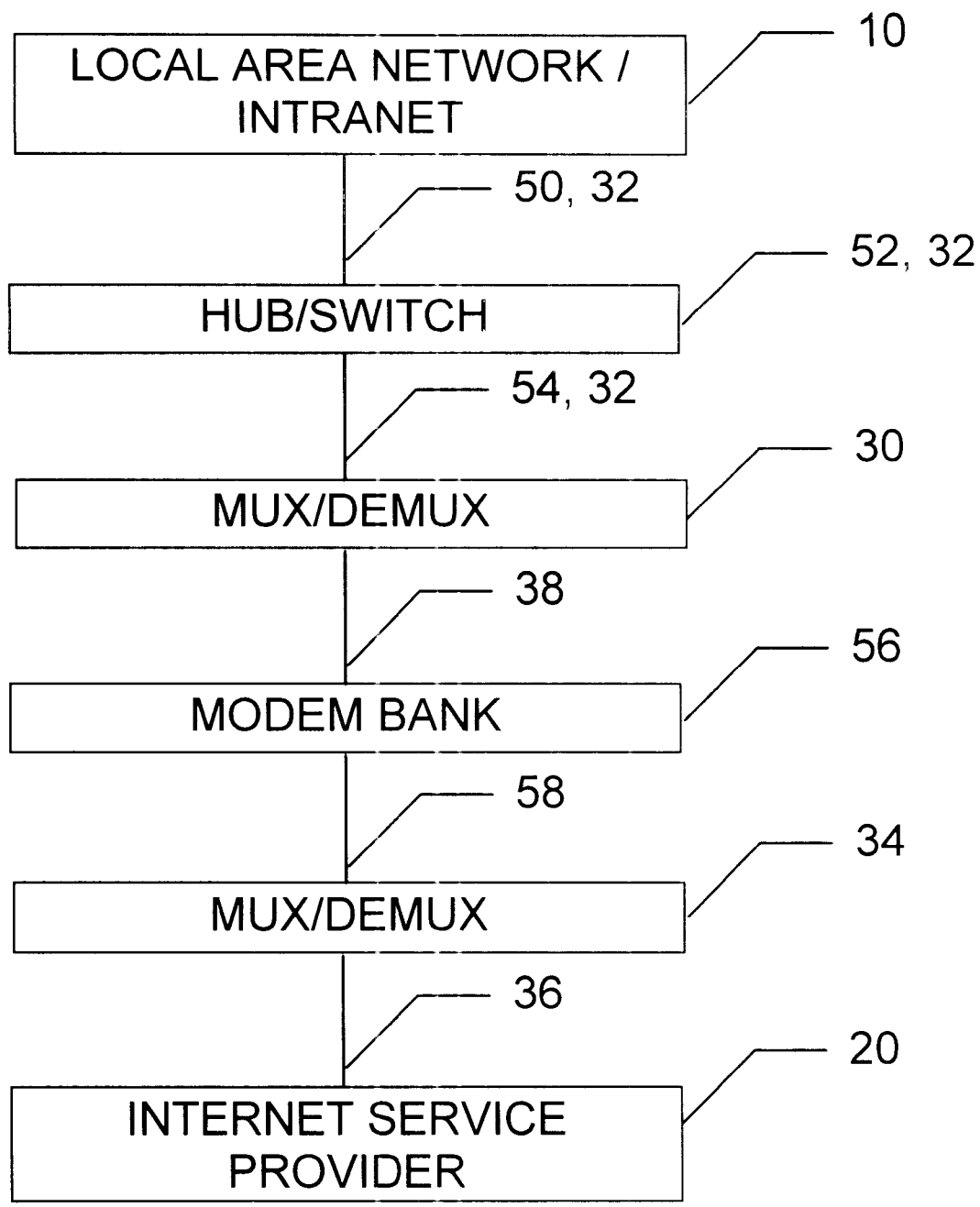
FIG. 5 is a diagram illustrating another alternative approach for connecting two LANs according to the present invention.

According to the approach illustrated in FIG. 5, the mux-demux 30 communicates with a modem bank 56 at the remote site. The modem bank 56 includes modems capable of making connections with device 30. Multiple modems in the bank 56 are connected by respective lines 58 to the "interceptor," which is mux-demux 34.

When the first serial connection is established between device 30 and the modem bank 56, device 30 sends a message indicating that multiple modem connections are requested for the user in question. This message is intercepted by device 34. Device 30 then makes multiple connections to the same or different modems in the modem bank 56. When the first modem connection is made, a unique ID is assigned by the arbitrator. It may take the form of an IP address. Then for the following connections, different modems assign unique IP addresses to different connections to the device 30. Device 30 uses the N IP addresses to send the data to the ISP 20. Device 30 multiplexes the LAN user's data over the multiple serial lines in the pipe 38 using multiple IP addresses. The interceptor 34 maintains a table of the IP addresses and ensures that the data being transmitted to the LAN 12 over the Internet 14 is the demultiplexed data from device 30, with a single IP address and with the data in the right sequence. With similar architecture at the receiving end, this provides a single high speed connection 38, 48 between the two LANs 10, 12 for the user.

Figure 6:
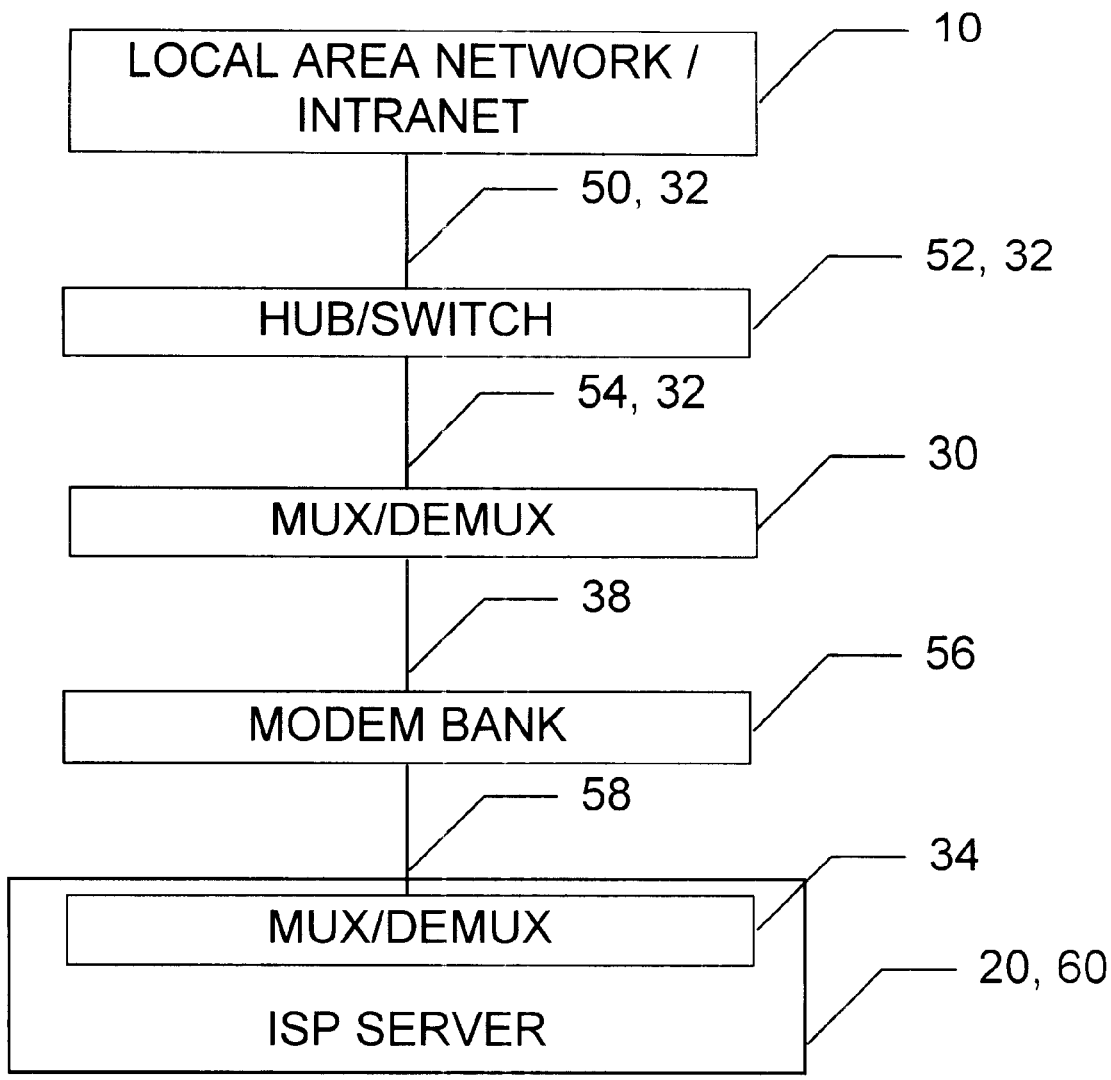
FIG. 6 is a diagram illustrating a third approach for connecting two LANs according to the present invention.

According to the approach illustrated in FIG. 6, the mux-demux 30 communicates with a software device 34 loaded on a server 60 at the remote site. The software includes a software version of the mux-demux 34. The mux/demux software 34 may be transferred over a WAN or LAN or other connection for loading on the server 60.

Multiple modems in the modem bank 56 are connected to the network server 60. When the first serial connection is established between device 30 and the modem bank 56, device 30 sends a message indicating that multiple modem connections are requested. This message is intercepted by the server software 34. Device 30 then makes multiple connections to the modem bank 56. When the first modem connection is made a unique ID is assigned by the arbitrator, such as an IP address. The first modem may sense the IP (or similar unique identifier) of the other WAN or modem connections or it may wait for individual IP addresses to be assigned to different connections in the pipe 38. For the subsequent connections, different modems assign unique IP addresses to different connections in the pipe 38.

Device 30 is thus assigned N IP address to send the data to the ISP server 20. Device 30 multiplexes the LAN data over the multiple serial lines in the pipe 38 using multiple IP addresses. The interceptor software 34 maintains a dynamic table of IP addresses being used by the connections to device 30 and ensures that the data being received from the LAN 10 and forwarded to the server 60 is the demultiplexed data from device 30 with a single IP address and in the right sequence. This provides a virtual single high speed connection 38 between the two LANs 10, 20.

Handling Multiple Users

The connection and data flow sequences described above assume data transmission is provided through one virtual "fat pipe" connection 38, 48 (FIGS. 3 through 6) for one user. The same concepts can be applied to multiple users, with each user having his or her own virtual "fat pipe" connection formed of multiple lines operating concurrently. In one embodiment of the invention, multiple users are routed through multiple respective virtual high speed pipes such as the pipes 38, 48.

Error Handling

In the event the requested number of modem connections cannot be made, then the mux-demux 30 will inform the user or administrator of the number of connections available and proceed according to the user's commands. The software in the device 30 includes a re-try option which will continue to retry adding a connection to the pipe 38. If the desired connections become available, then the device 30 will automatically establish those connections, thereby providing the requested number of connections.

In the event a line in the pipe 38 gets disconnected during the transfer of data, the mux-demux 30 automatically senses the lost connection and continues to transfer the data over the remaining available lines. The device 30 will try to re-establish the connection on any available line. The demux 34 will be informed of the loss of connection. The demux 34, when it senses a loss of connection, will automatically stop polling the lost connection and continue transmitting with the remaining (connected) lines.

Handshaking information is normally transmitted over the first line connected; this may include information such as the number of lines requested, their respective IP addresses or other identifiers, and their sequence if line sequencing is used instead of embedding sequence numbers in the packets. In the event this first line loses its connection, the second line, or other line(s) will handle the handshake protocol. The protocol handling line will continue to update the demux 34 regarding any additions or changes to the multiple connections in the pipe 38 or in the sequencing.

Handling Bandwidth Requests

In the event there are no other users, then any user authorized to get high bandwidth can dial in and all the available lines are assigned to that user's pipe 38. If more users sign in, the mux 30 may reassign some of the first user's lines to other users and inform the demux 34 that a new user will be using certain IP numbers, resulting in a new IP table.

Another approach is to disconnect and re-connect the modem lines, so that new IP addresses are assigned, in which case the original handshake procedure is followed. The systems administrator may also decide which individuals have access to high bandwidth and the software in the device 30 will keep a table of such users along with their passwords and their allocated bandwidth.

Firewalls

Commonly used firewalls will assist in ensuring the integrity of the LAN 10 to LAN 12 or LAN 10 to ISP 20 connection. However, the manner in which the software 30, 34 handles IP addresses when muxing and demuxing is in itself a firewall, as only authenticated IP addresses are accepted.

Configurable Memory

The servers 60, modems, mux/demux devices 30, 34, 40, 42 and/or associated computer systems are capable of using floppy drives, tape drives, optical drives, computer chips or other means to read a storage medium. A suitable storage medium includes a magnetic, optical, or other computer-readable storage device having a specific physical substrate configuration. Suitable storage devices include floppy disks, hard disks, tape, CD-ROMs, PROMs, RAM, and other computer system storage devices. The substrate configuration represents data and instructions which cause the computer system to operate in a specific and predefined manner as described herein. Thus, the medium tangibly embodies a program, functions, and/or instructions that are executable by the servers, modems, mux/demux and/or other computer systems to perform line connection, allocation, management, and/or transmission steps of the present invention substantially as described herein.

Additional Operational Details

Figure 7:
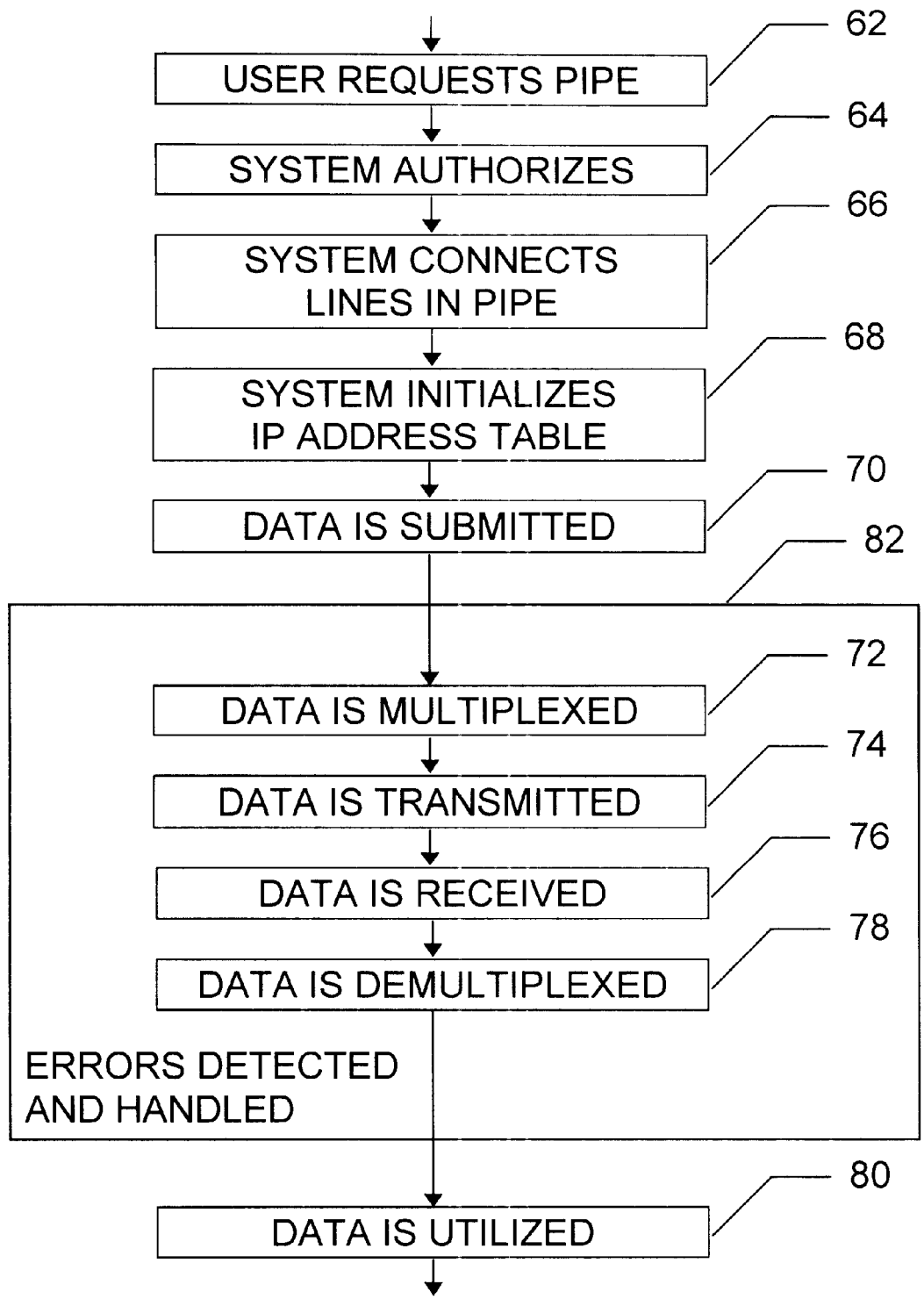
FIG. 7 is a flowchart illustrating a connection method of the present invention.

FIG. 7 further illustrates methods of the present invention; in discussing this Figure, reference will also be made to FIG. 3. Method steps are illustrated for a single user, but may be repeated to provide each of several users with their own virtual "fat pipe" connection for data transmission.

During a requesting step 62, a LAN or intranet user requests a pipe such as the pipe 38, 48 for high speed data transmission. During an optional authorizing step 64, the system software in the device 30 checks to see if the user is authorized for high speed transmission through a pipe. The system also optionally checks to see how many lines, what bandwidth, or what level of speed has been authorized for the user. According to one variation, no more than a predetermined maximum number of connections is exclusively allocated to the user at one time. According to another variation, no more than a predetermined maximum bandwidth of connections is exclusively allocated to the user at one time.

During a connecting step 66, the connections comprising the pipe are made. One of the connections obtained by the step 66 may be a channel on a multi-channel line if the other obtained connections are physically separate from that line.

One approach for connecting N lines to create a pipe 38 is for the device 30 to connect the first line and then send a message to the remote device 34 causing connection of the remaining N−1 lines. Alternatively, the device 30 may connect all N lines. The IP addresses or other identifiers for the N lines in the pipe are procured, and transmitted to the other device 30, 34 (whichever device doesn't yet have that information). If transmission is being made by sequencing the lines rather than by sequencing the individual packets, the modem/line sequence is also transmitted so that the demultiplexing of data packets by device 34 arestores the data's internal order. The IP addresses and modem/line sequence are stored in memory in the devices 30, 34 during an initializing step 68.

The user submits data during a step 70. The devices 30, 34 will typically be bidirectional, so data may also be submitted by a user or software process or hardware device at the other end of the pipe for transmission to the user who requested the pipe during step 62. The data may be sensory data to be transmitted in a real-time manner, such as live audio or visual data, or it may be a file sent or requested by the user, or other data.

During a step 72, the device 30 takes the data stream and multiplexes it over the N lines allocated to the user. One embodiment submits the data packets to the allocated connections using a round-robin distribution; another submits the data packets to the next available line among the allocated connections. The data is transmitted over the N lines during a step 74 and received during a step 76.

During a demultiplexing step 78, the remote device 34 checks the IP address table and sequencing information, and places the parallel data packets back in sequence for transmission to the LAN 12 or the Internet 14 under a single IP address. On arrival, the data is utilized during a step 80.

An error or exception detection and handling step 82 is preferably performed by polling, interrupt handling, or a similar mechanism during and/or between one or more of the steps 72 through 78. In the event there is a failure of one or more lines of the pipe 38 during transmission, the error is automatically sensed by both sides of the connection. The dynamic IP address table is updated to drop the failed line(s) from the multiplexing and demultiplexing operations. Data is transmitted over fewer lines, and the user is informed of the situation.

Software in the devices 30, 34 may try to add lines to compensate for the lost lines. For instance, if an error is detected during the connection obtaining step 66 the error handling step 82 may cause the device 30 to try more than once to obtain a connection. If new connections are established, the multiplexing and demultiplexing routines are informed, and the dynamic IP address table and modem/line sequence table are updated. Transmission continues on the full complement of lines authorized.

If the error is detected during the sending step 70 the error handling step 82 may cause the device 30 to try to establish a replacement connection after an obtained connection has failed. The error handling step 82 may also cause the device 30 to send handshake protocol packets to the device 34 over the replacement connection instead of trying to send them over the obtained connection that failed.

Figure 8:
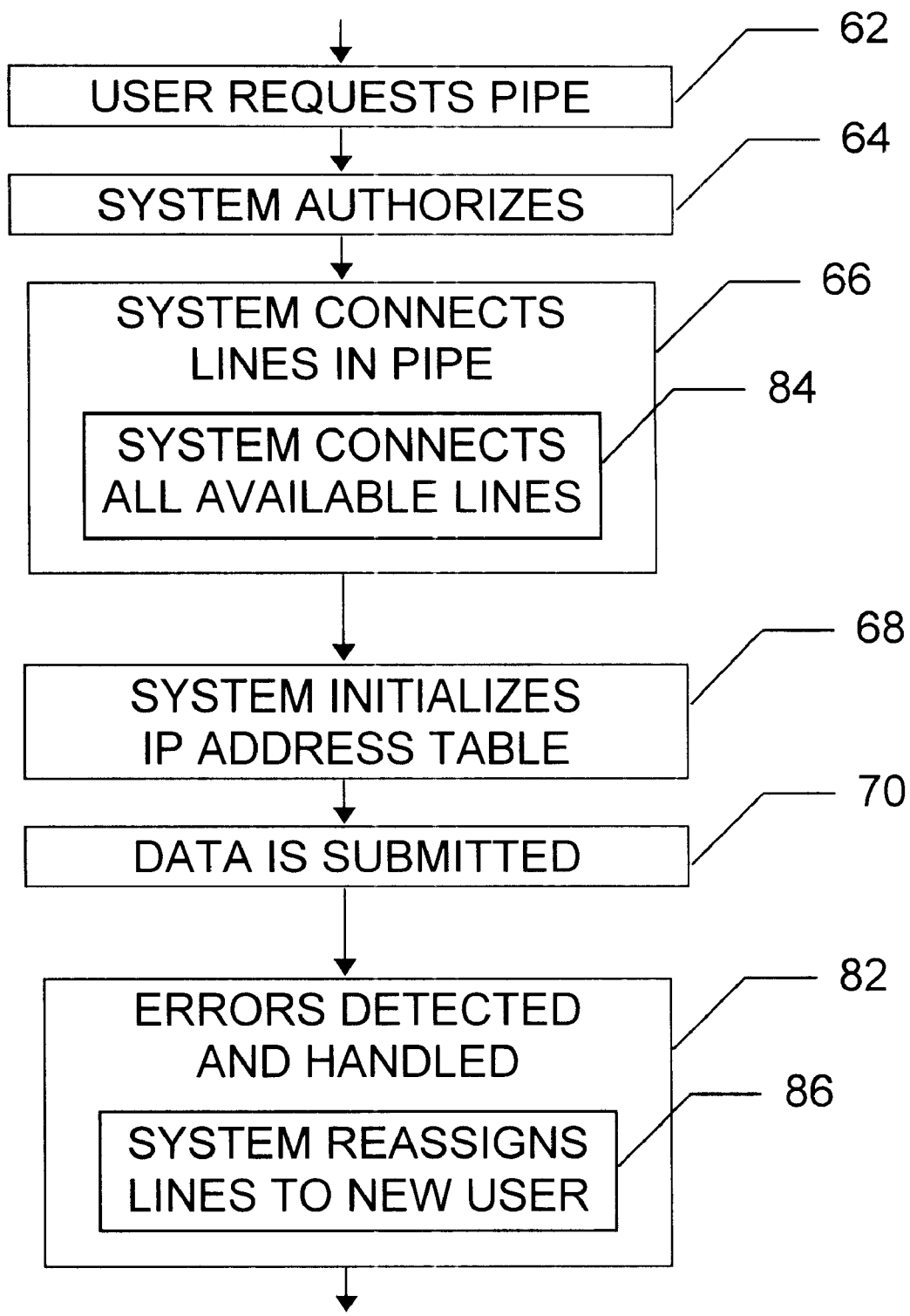
FIG. 8 is a flowchart illustrating an alternative connection method of the present invention.

FIG. 8 illustrates a variation of the methods of FIG. 7 which provides dynamic management of allocated lines in a pipe 38. During the connecting step 66, a check is made to see whether unused lines or the absence of other users makes it possible to allocate more lines than the user requested. All available lines are then allocated to the user and connected during a step 84.

During the error and exception handling step 82, polling, interrupt handling, or another method is used to detect a pipe requesting step 62 made by a second user, or a simple request for a single serial line made by the second user. The devices 30, 34 disconnect one or more lines from the first user's pipe 38 and reallocate those lines to the second user during a step 86, according to a predetermined corporate access policy. The dynamic IP address and sequence tables are updated accordingly. The corporate access policy may reflect criteria such as the total available bandwidth, the duration and/or frequency of requests, priority overrides, and similar factors.

Data Structures

Figures 9, 10:
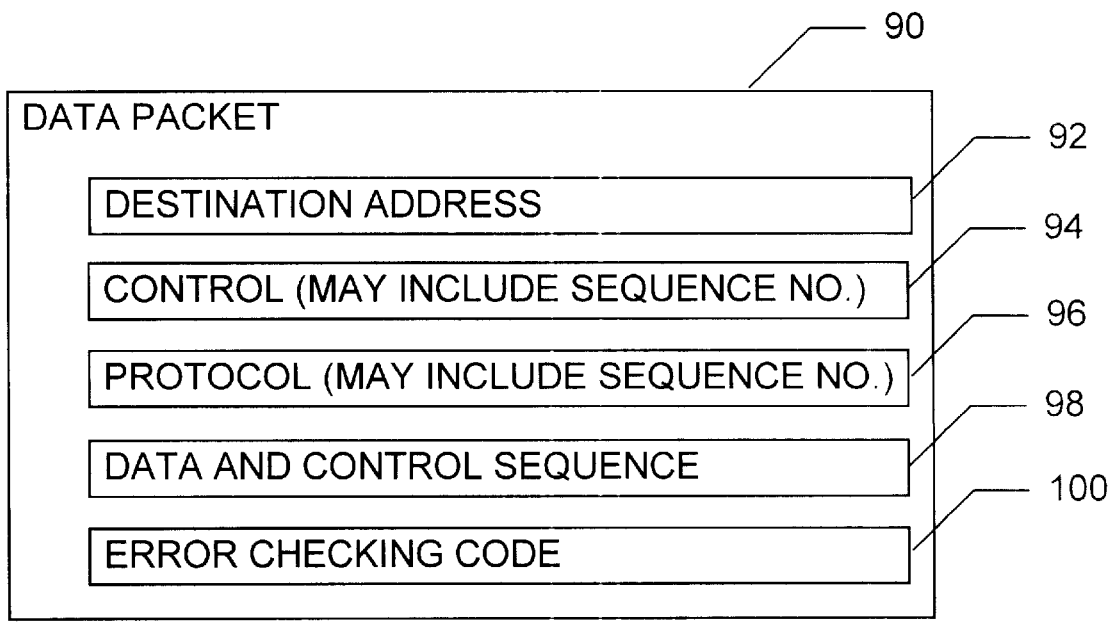
FIG. 9 is a diagram illustrating combined IP address and sequence tables of the present invention.
FIG. 10 is a diagram illustrating a data packet format according to the present invention.

FIG. 9 illustrates one embodiment of a combined IP address and sequencing table 88 according to the invention. As noted above, the table contents are dynamically updated as lines in a pipe 38 are lost, intentionally dropped, or added. A similar table is maintained for each user (one IP address table per pipe 38).

FIG. 10 illustrates embodiments of a data packet 90 according to the invention. A destination address 92 may be an IP address or other network address. Depending on the packet format (IP, IPX, and so forth), sequence numbers may be placed in otherwise unused bits in a control field 94 or in a protocol field 96. Sequence numbers may also be omitted, if the lines themselves, rather than the individual packets, are sequenced during multiplexing and transmission. Control sequences may also be placed in a data portion 98 of the packet by the sending device 30; control sequences will be stripped out by the receiving device 34 before it forwards the reconstructed data stream.

The multiplexing and sending steps preferably send all of the user data contained in a given packet over the same allocated connection rather than dividing the data between connections. The data packets used may vary in length. Each packet 100 optionally contains an error detection and/or correction field 100 such as a cyclic redundancy check or Hamming code field. Data sequence numbers may be used as an alternative to, or in conjunction with, the dynamic address table sequencing routine.

Conclusion

The present invention provides each user with a virtual "fat pipe" connection which supports concurrent data transmission over separate standard telephone lines. This can help ISPs provide a value added service to customers who need additional bandwidth and who are willing to pay a premium for improved service but unwilling to pay for a dedicated line such as a T1 line. The invention can help corporations save money by reducing time spent by staff to download or transmit data.

Although particular methods embodying the present invention are expressly illustrated and described herein, it will be appreciated that system and article embodiments may be formed according to methods of the present invention. Unless otherwise expressly indicated, the description herein of methods of the present invention therefore extends to corresponding system and articles, and the description of system and articles of the present invention extends likewise to corresponding methods.

The invention may be embodied in other specific forms without departing from its essential characteristics. Steps may be reordered, performed concurrently, or omitted unless indicated otherwise. The described embodiments are to be considered in all respects only as illustrative and not restrictive. Any explanations provided herein of the scientific principles employed in the present invention are illustrative only. The scope of the invention is indicated by the appended claims rather than the description above. All changes that come within the meaning and range of equivalency of the claims are to be embraced within their scope.

What is claimed and desired to be secured by patent is:

1. A method for transmitting a user's data between two computer networks, the method comprising:

obtaining at least two connections between the two computer networks, each of the connections using a telephone line which is physically separate from the other connection(s) for at least a portion of that connection;

allocating the obtained connections exclusively to the user for a period of time;

placing the user's data in data packets configured to also contain a computer network address; and sending the data packets concurrently over the allocated connections, said sending step including multiplexing by sending a first data packet containing a first portion of the user's data and a first network address over a first allocated connection and concurrently sending a second data packet containing a second portion of the user's data and a second network address over a second allocated connection.

2. The method of claim 1, wherein at least one of the data packets is configured to contain a computer network address which is an IP address.

3. The method of claim 1, wherein the step of sending the data packets comprises sending a first data packet containing a first portion of the user's data and a first IP address over a first allocated connection and concurrently sending a second data packet containing a second portion of the user's data and a second IP address over a second allocated connection.

4. The method of claim 3, further comprising the steps of:
sending data packets between the user and the allocated connections; and
mapping between multiple IP addresses contained in data packets sent concurrently over the allocated connections and a corresponding single IP address contained in corresponding data packets sent between the user and the allocated connections.

5. The method of claim 1, wherein the obtaining, allocating, placing, and sending steps are repeated for another user, and the time periods of exclusive allocation of the respective obtained connections of the users overlap.

6. The method of claim 1, wherein no more than a predetermined maximum number of connections is exclusively allocated to the user at one time.

7. The method of claim 1, wherein no more than a predetermined maximum bandwidth of connections is exclusively allocated to the user at one time.

8. The method of claim 1, further comprising the step of handling an error.

9. The method of claim 8, wherein the error is detected during the obtaining step and the error handling step comprises trying more than once to obtain a connection.

10. The method of claim 8, wherein the error is detected during the sending step and the error handling step comprises trying to establish a replacement connection after an obtained connection has failed.

11. The method of claim 10, further comprising the step of sending handshake protocol packets over the replacement connection instead of trying to send them over the obtained connection that failed.

12. The method of claim 1, wherein the sending step transmits sensory data in a real-time manner.

13. The method of claim 1, wherein the obtaining step obtains connections between two local area computer networks.

14. The method of claim 1, wherein at least one of the connections obtained by the obtaining step is a channel on a multi-channel line and the other obtained connections are physically separate from that line.

15. The method of claim 1, wherein the data packets vary in length.

16. The method of claim 1, wherein the placing step occurs after the obtaining step.

17. The method of claim 1, wherein the sending step sends all of the user data contained in a given packet over the same allocated connection rather than dividing the data between connections.

18. A computer storage medium having a configuration that represents data and instructions which will cause at least a portion of a system to perform method steps for transmitting a user's data between two computer networks, the method steps comprising the steps of:
obtaining at least two connections between the two computer networks, each of the connections using a telephone line which is physically separate from the other connection(s) for at least a portion of that connection;
allocating the obtained connections exclusively to the user for a period of time;
placing the user's data in data packets configured to also contain a computer network address; and
sending the data packets concurrently over the allocated connections, said sending step including multiplexing by sending a first data packet containing a first portion of the user's data and a first network address over a first allocated connection and concurrently sending a second data packet containing a second portion of the user's data and a second network address over a second allocated connection.

19. The storage medium of claim 18, wherein each network address is an IP address, and the method steps further comprise the steps of:
sending data packets between the user and the allocated connections; and
mapping between multiple IP addresses contained in data packets sent concurrently over the allocated connections and a corresponding single IP address contained in corresponding data packets sent between the user and the allocated connections.

* * * * *